United States Patent
Butnaru et al.

(10) Patent No.: US 6,240,392 B1
(45) Date of Patent: May 29, 2001

(54) COMMUNICATION DEVICE AND METHOD FOR DEAF AND MUTE PERSONS

(76) Inventors: Hanan Butnaru, 1 Somerville Ct., San Antonio, TX (US) 78257; Wesley O. Krueger, 4410 Medical Dr., Suite 340, San Antonio, TX (US) 78229

( * ) Notice: Subject to any disclaimer, the term of this patent is extended or adjusted under 35 U.S.C. 154(b) by 0 days.

(21) Appl. No.: 08/920,820

(22) Filed: Aug. 29, 1997

Related U.S. Application Data

(60) Provisional application No. 60/025,480, filed on Aug. 29, 1996, and provisional application No. 60/026,400, filed on Aug. 29, 1996.

(51) Int. Cl.[7] .................................................. G10L 15/20
(52) U.S. Cl. ........................................... 704/271; 704/272
(58) Field of Search .................................. 704/271, 272, 704/270, 258, 200, 201, 231, 276

(56) References Cited

U.S. PATENT DOCUMENTS

| | | | |
|---|---|---|---|
| 3,746,793 | * | 7/1973 | Sachs et al. ............................. 179/2 |
| 3,936,605 | * | 2/1976 | Upton ................................... 704/271 |
| 4,268,721 | * | 5/1981 | Nielson et al. .......................... 179/2 |
| 4,414,431 | * | 11/1983 | McCartney ............................ 704/271 |
| 4,694,494 | * | 9/1987 | Woolfson .............................. 704/271 |
| 5,526,407 | * | 6/1996 | Russel et al. .......................... 704/200 |
| 5,710,806 | * | 1/1998 | Lee et al. ................................ 379/96 |
| 5,774,857 | * | 6/1998 | Newlin ................................. 704/271 |
| 6,049,328 | * | 4/2000 | Vanderheiden ....................... 345/173 |

OTHER PUBLICATIONS

IEEE Globecom 1988. Global telecommunication Conference, Dec. 1988. Bazzani et al., "PC–Based Communication system for Deaf–Blind People". pp. 2.3.1 to 2.3.5.*

* cited by examiner

*Primary Examiner*—Richemond Dorvil
(74) *Attorney, Agent, or Firm*—Jenkens & Gilchrist, A Professional Corporation

(57) ABSTRACT

A communication device for deaf, hearing impaired, or mute persons comprises a processor control system which makes use of a microphone and a speech recognizer to receive and process audio data (speech or non-speech) to determine whether or not a dangerous situation exits within the environment surrounding the user. The system comprises a key pad and/or stylus and tablet information input system to accommodate communication from the user to the persons in the surrounding environments and a visual display capability to transmit the information so acquired by way of a projection apparatus in the form of characters and in the language to which the user is accustomed. Indicator signals which correspond to dangerous or cautionary situations relating to abnormally loud noises, or readily recognized sound patterns, such as a siren may also be displayed to the user, as may be information related geographic location, distance to a preset destination, or other personally useful information.

27 Claims, 2 Drawing Sheets

COMMUNICATION DEVICE AND METHOD FOR DEAF AND MUTE PERSONS

This application claims the benefit of U.S. Provisional Application Nos. 60/026,400, and 60/025,480, filed Aug. 29, 1996.

BACKGROUND OF THE INVENTION

1. Field of the Invention

This invention relates generally to a device for communication between persons who are deaf, hearing impaired, or mute. More particularly, the invention is directed toward a communication system for deaf, hearing impaired or mute persons which allows the user to visualize speech and other sounds directed at him through various audio sources.

2. Background of the Invention

Historically, deaf, hearing impaired, and mute persons have had a difficult time communicating, both among themselves and with others not similarly handicapped. In fact, it is often more difficult to conduct a simple conversation between a non-handicapped person and one that is deaf or mute, because the non-handicapped person usually is not familiar with American Sign Language (ASL).

Even when the persons communicating are familiar with ASL, sign language is not a very convenient method of communication when a large group is involved. Expensive television cameras and video screens must be employed to transmit messages to large audiences. That is, unless the receiver of the message is so close to the message transmitter that he or she can distinguish ASL gestures and the expressions on the message transmitter's face, communication is simply not possible. As mentioned previously, if the message receiver has not been trained to understand ASL, then communication is also not possible.

Further, deaf persons often cannot enjoy television or the theater because the actors are not visible, or have turned their backs to the front of the stage so that lip-reading is impossible. Of course, this difficulty is also encountered during day-to-day communication scenarios whenever the speaker or communicator is not facing the deaf person, or is not located in the visual line-of-sight range of the deaf person. In addition, there are occasions when an unusually loud noise is used to alert persons in the vicinity that a dangerous or cautionary event is about to occur. This can be the siren of an ambulance or fire engine, an explosion, the horn of an automobile or truck, etc. While a person able to hear such sounds can immediately identify these circumstances as requiring caution or flight, the deaf person will be unaware that he is in danger.

Several elements of the instant invention have only recently become generally available due to the general trend of technology miniaturization and a reduction in the price of sophisticated microprocessor control systems. More specifically, this includes the technologies of speech recognition, short-range infrared and radio data communication, personal video displays, and handwriting recognition. The present invention is directed toward overcoming the communication difficulties set forth above.

It is desirable to have an apparatus and method enabling communications between deaf, hearing impaired, or mute persons and others, whether similarly handicapped or not. It is also desirable to have an apparatus and method for use by deaf or hearing impaired persons to enable them to enjoy television or movie theaters without subtitles, ASL interpreters, etc. In addition, it is desirable to have an apparatus and method which enables deaf and/or mute persons to communicate with others who may not be in close proximity. Furthermore, it is desirable to have an apparatus and method which enables communication between a single individual and a group, whether or not all individuals participating in the communication have the ability to speak or hear without impairment.

While ASL has been developed for enhancing the communication abilities of deaf and mute people, most non-handicapped persons are not trained in its use. Even those that are trained are unable to use it for communication in circumstances where line-of-sight communication is impossible or impractical. Thus, there exists a long-felt and widespread need to provide alternative communication apparatus and methods for deaf, hearing impaired, and mute persons which can be used at a distance, in situations where line-of-sight communication is impossible or impractical, where communication with a group of mixed non-handicapped persons and deaf and/or mute persons is desired, or in everyday situations which render common means of understanding by hearing impaired persons (e.g., lip-reading) ineffective. This is especially the case for dangerous situations in which a loud sound emanates from an undisclosed location and the deaf person remains unaware of its existence. The apparatus and method of the present invention, discussed in greater detail below, clearly satisfy this need.

SUMMARY OF THE INVENTION

The present invention provides a communication system for deaf, hearing impaired, and mute persons, or those communicating with hearing impaired and/or mute persons. The communication system of the present invention comprises a message reception means to receive audio information, such as a microphone and an optional filter; an information conversion means, such as a speech recognizer, to convert the received information into speech data; a data processing means, such as a microprocessor, to organize the speech data into an appropriate and meaningful symbolic representation; and a display means, such as a see-through liquid crystal display to display the symbolic representation of the speech data (usually English language text symbols) to the user. The processing means also has the ability to process other audio data (e.g. non-speech) to determine whether or not a dangerous situation exists within the environment surrounding the user.

Further, the apparatus and method of the present invention comprises a message entry means, such as a keypad and/or stylus-and-tablet to acquire messages from the user. The apparatus and method of the present invention also comprises a message transmission means, such as a voice synthesizer and speaker, to convert the user messages into message data, and convey the message data as audio output, preferably speech, to the user's immediate physical environment.

In another aspect of the present invention, a method and apparatus is provided for communication between hearing impaired, deaf and/or mute persons and others, including a group of people, which involves use of an optional element of the message transmission means, comprising a remote data transceiver electrically connected to the processor of the present invention so as to transmit and receive message information from other communication systems that are not in the immediate vicinity.

Other features of the apparatus and method include the ability to produce indicator signals for display to the user which correspond to dangerous or cautionary situations relating to abnormally loud noises, or readily recognized sound patterns, such as a siren. The apparatus may also comprise a cellular phone which operates as an adjunct to the microphone and speaker elements, providing mobile telephone communications for the handicapped. In addition, indications can be transmitted to the user representing information related to geographic location, distance to a present destination, or other personally useful information. The above and other advantages of this invention will become apparent from the following more detailed description, in conjunction with the accompanying drawings and illustrative embodiments.

DESCRIPTION OF THE PREFERRED EMBODIMENT

Figure 1:
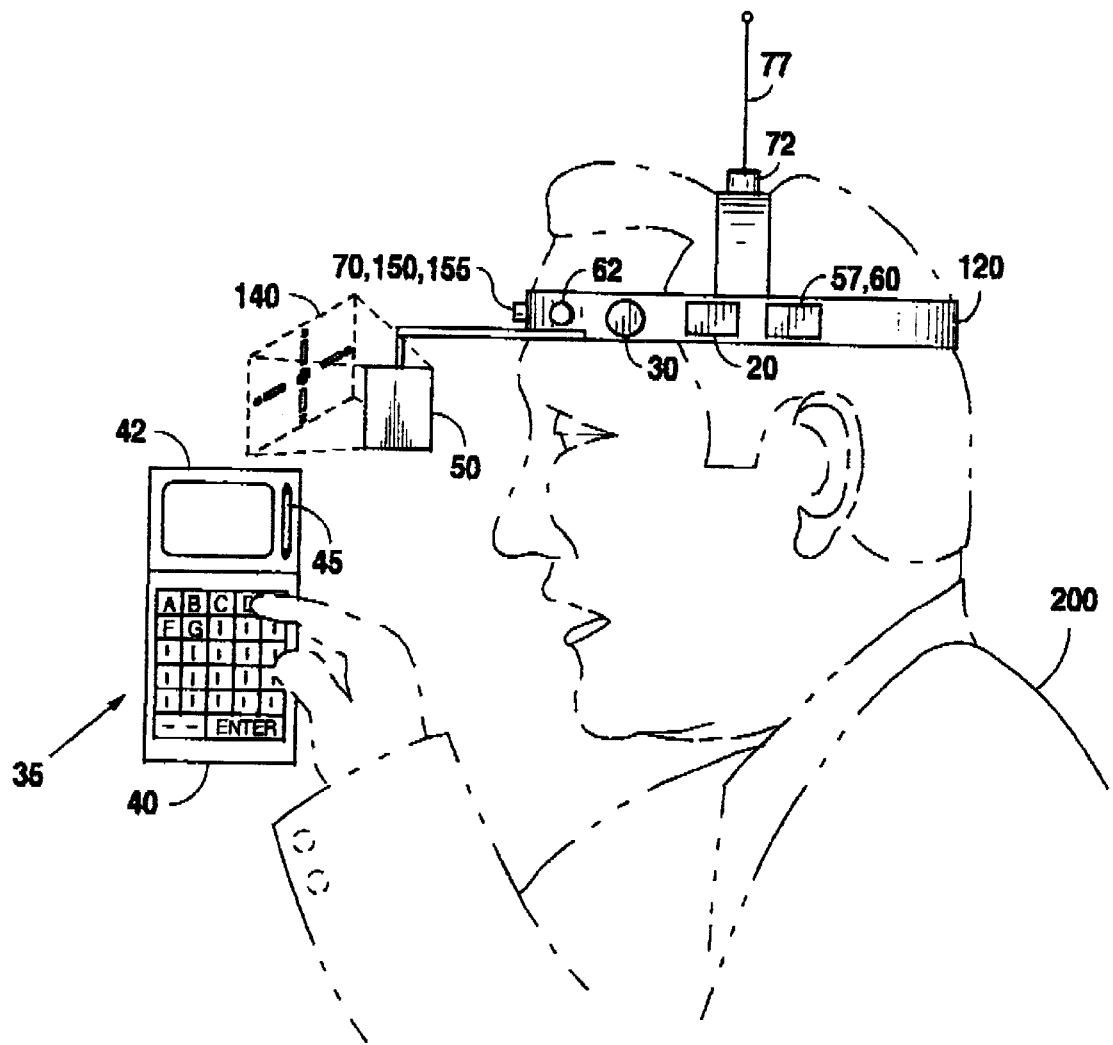
FIG. 1 is a perspective view of the present invention indicating a user's perception of a projected message image.

FIG. 1 illustrates a perspective view of an exemplary embodiment of the present invention, as it is worn by user 200. A communication system 10 for deaf, hearing impaired, or mute persons optionally comprises headband 120, or other suspension means, such as eyeglasses, goggles, or a helmet, for supporting the various component elements which comprise the present invention.

The user 200 receives messages, including speech and other audio information, by way of a message reception means, such as a microphone 70, most preferably a self-powered and unobtrusive clip-on type. The communication system 10 also comprises a data processing means, such as a wearable processor 20, which may be co-located with the user 200 and electrically connected to a display means, such as a projector 50, so as to control the content of the projector display 140.

A keypad-tablet 35, or other user message entry means, comprising a keyboard 40 and a handwriting recognition display 42, is manipulated by the user 200 to present user message information to the wearable processor 20 for transmission to the environment surrounding the user 200 by way of a speaker 60 and/or a remote data transceiver 72. A stylus 45 can be used to write on the recognition display 42 so that the printed or handwritten message entry by the user 200 can be recognized by the wearable processor 20 and communicated to the environment surrounding the user 200. A keypad-tablet 35 may be connected directly to the processor 20, or communicate with the processor 20 via radio or other electromagnetic means, such as by infra-red signals (commonly found on television remote control devices). The wearable microprocessor 20 is capable of transmitting messages into the environment by way of a message transmission means comprising a synthesizer 57, which converts user messages into message speech data, and a speaker 60, which presents audio information to the environment surrounding the user 200.

Figure 2:
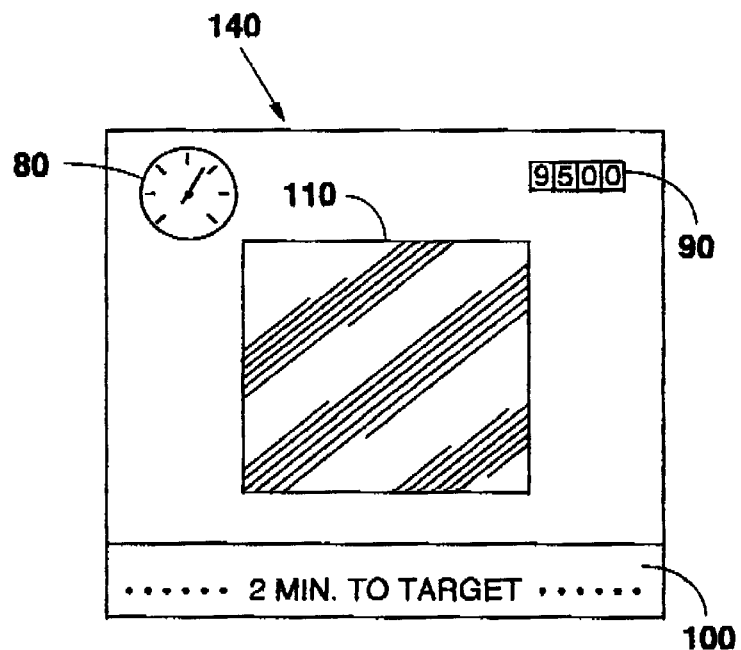
FIG. 2 is a stylized representation of the display for the user, including messages and various information indicators.

Turning now to FIG. 2, a representative sample of the display of the communication system 10 can be seen. Essential to the practice of the invention is the message area 100, which contains the collection of alphanumeric characters which communicate speech to the user, after it has been recognized from audio information in the surrounding environment, or submitted to the processor 20 by way of a remotely transmitted message from a similar device. It is preferred that the message area 100 be located on the periphery of the display 140 so that the viewing area directly in front of the user 200 remains clear. However, it is most preferred that projector 50 presents a display 140 to the user 200 which can be seen through (a "see-through" display), so that any message text or indicators shown thereon will not interfere with the user's normal line of sight. While shown as a single message line display, those skilled in the art will realize that several message lines can also be projected onto display 140. Most preferably, message area 100 will comprise two lines of material presented in teleprompter fashion.

A first indicator 80 and a second indicator 90 represent optional elements of the display 140. The first indicator 80 may consist of an alarm icon, flashing light, or some type of analog display symbol which indicates the amount of noise in the environment. Of course, these possibilities are listed by way of example, and not by way of limitation. Similarly, the second indicator 90 may represent a geographical position location, generated by an attached Global Positioning Satellite (GPS) system, the distance of the user from a selected location, or the sound level of the surrounding environment in decibels. Of course, these specific examples of the content of second indicator 90 are not meant to limit the possibility for display of information to the user. Any information which can be processed by the wearable processor 20, either acquired from the surrounding environment, or pre-programmed into the unit, can be displayed to the user 200 at an appropriate time. Similarly, the time of day or of a specific event can also be included in the content of the second indicator 90.

Figure 3:
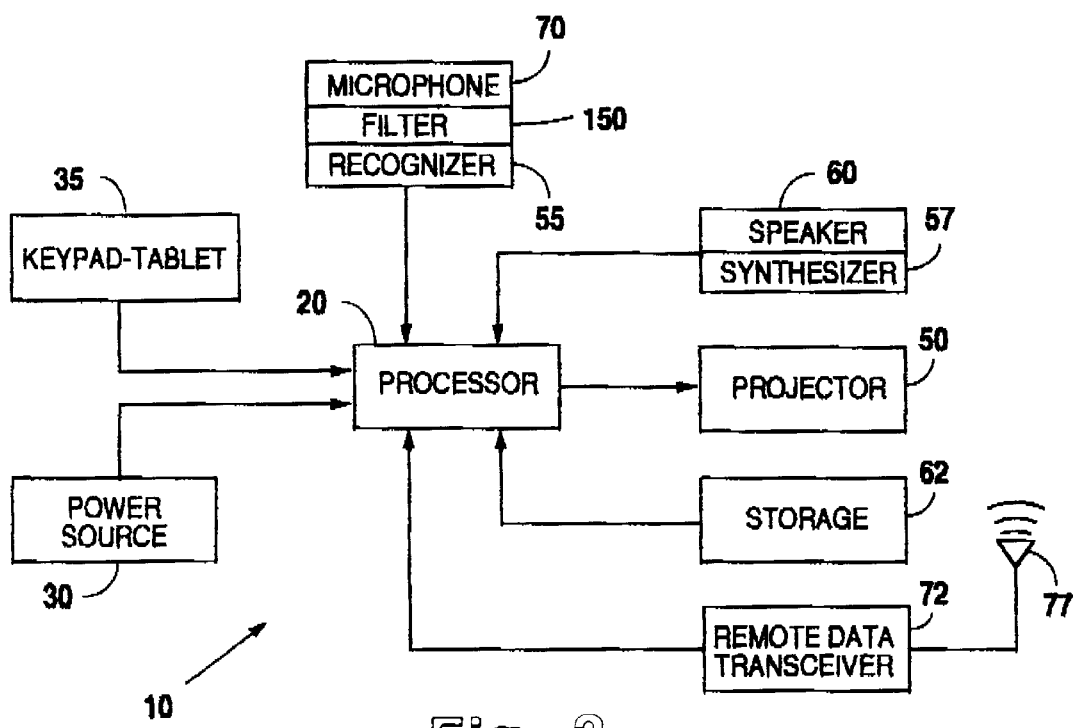
FIG. 3 is a simplified block diagram of the present invention.

Turning now to FIG. 3, a simplified block diagram of the communication system 10 can be seen. A power source 30, which may consist of a rechargeable battery, solar cell, or other electric current power generator, provides power to the wearable processor 20. To process surrounding environmental audio data, the environmental message reception means comprising the microphone 70, and optionally, the filter 150, is used to acquire audio information. A filter 150 is most preferably implemented as a band-pass filter which passes frequencies from about 500 Hz to about 2,999 Hz. As a further aid to recognizing speech, any of several noise cancellation techniques can be implemented by the wearable processor 20 or the speech recognizer 55. Information conversion means, such as a speech recognizer 55, preferably operates in a manner that will accept continuous speech input and other audio information (such as a police siren tone pattern or abnormally loud sound), using templates and a vocabulary lookup table, or other methods well known in the art, and convert it into speech data. The data processing means processor 20 will then organize the speech data into a meaningful symbolic representation for transmission to the projector 50.

To process user initiated messages, the message entry means such as the keypad-tablet 35 is used to acquire user message information, which is passed on to a message transmission means, comprising a speech synthesizer 57 and a speaker 64, producing an audible signal in the user's immediate vicinity. Synthesized speech, produced by any of several methods well known in the art, is most preferably formed by the synthesizer 57 so as to mimic the gender of the user. In this manner, a mute person can communicate with those that can hear. The message transmission means may alternatively comprise the synthesizer 57 and a remote data transceiver 72, wherein the keypad-tablet 35 user input message information can alternatively be sent to a remote location via the remote data transceiver 72 and an energy transceiver 77. The remote data transceiver 72 comprises an electromagnetic energy transceiver capable of receiving and transmitting electromagnetic energy using an appropriate energy transceiver 77. If the electromagnetic energy consists of infrared or other light, then a laser diode transmitter and receiver, or similar devices, would be most appropriate to use as the energy transceiver 77. If the electromagnetic energy consists of radio waves, then an antenna designed for the desired frequency and bandwidth should be used as the energy transceiver 77.

By means of the above-described apparatus and method of communication, any person, whether mute or not, can communicate at a distance with another person who is hearing-impaired or deaf. Of course, such communications can also exist between persons at each end of the communication link who are not disabled. In any event, those skilled in the art will recognize that such an arrangement of remote radio communication devices also lends itself to multi-channel communication, which allows groups of disabled users to communicate amongst themselves, either out loud, or silently. Another example of system use might enable all English speakers to communicate on one channel, and all Spanish speakers on another. Such multi-channel operation is desired to enhance user privacy and the practicality of the system. It is anticipated that a single "international" frequency, along with several "national" frequencies will be allocated to facilitate communications between people of differing countries, and the same country, as desired.

The processor 20 can be programmed to recognize a dangerous or a cautionary situation, due to the sheer magnitude of the electrical signal received, or based on a recognized pattern, and will thereafter display an alarm signal by way of the first indicator 80 to the user 200 via the projector 50 and the display 140. Operation of the communication system 10 by using audio input and output (via the microphone 70 and the speaker 60) obviates the need for ASL, and allows deaf, hearing impaired, or mute persons to communicate with others that are similarly disabled, and also with individuals having unimpaired hearing and speech capability.

Environmental information, normally existing as local audio information, can also be received by way of the energy transceiver 77 and the remote data transceiver 72. Such remote information will normally originate from another communication system 10 at a remote location (i.e. outside of the line-of-sight, or out of normal hearing range) and consist of audio information, or speech data. The acquired signals can then be processed by the speech recognizer 55 or, if already processed by the remote communication system 10, the received speech data can be sent directly to the processor 20 for organization into an appropriate symbolic representation of the data, and on to the projector 50 for viewing by the user 200 and, optionally, transmitted to the external environment via the speech synthesizer 57 and the speaker 60.

An optional element of the communication system 10 is a storage device 62, which can store several canned messages for recall by the user 200. This provides a convenient means of rapidly communicating standard words and/or phrases to the external environment. In addition, the storage device 62, which comprises battery-powered RAM memory, EPROMs, disk drives, or tape drives, can be used to save messages that have been received from the external environment for receipt and processing at a later time by the user 200.

In another embodiment of the communication system 10, a cellular telephone (not shown) can be used as a supplement to the microphone 70 and the speaker 60. When the telephone receives an incoming call, the first indicator 80 within the display 140 can be activated, along with a message to the user 200 that the "Phone is ringing." The user 200 can then choose to answer the phone, and any input via the keypad-tablet 35 will be converted to synthesized speech, which is sent to the telephone receiver, instead of the speaker 60. Similarly, any voice emanating from the telephone speaker output can be directed to the filter 150 and the speech recognizer 55 for conversion to text and display via the projector 50. This embodiment provides mobile telephone operation capability to deaf, hearing impaired, or mute persons, obviating the need for teletype (TTY) devices on one or both ends of a telephone conversation.

The processor 20 is understood to be equipped with the necessary hardware and software to translate speech it receives from the recognizer into another language if desired, and then to display the resulting message via the projector 50 onto the display 140. The recognizer 55 may also be implemented as part of the software programming for the processor 20, obviating the need for a separate hardware element. The invention also anticipates a combination of some or all of the separate elements, such as the microphone 70, the filter 150, the recognizer 55, the processor 20, the speaker 60, the synthesizer 57, and the storage device 62 into a single, integrated, hybrid unit. The separate elemental units are illustrated as such for clarity, and not by necessity. Likewise, the processor 20 can be remotely located to reduce local weight/power requirements. A separate radio data communications path (not shown) can be used to transmit and receive processed audio and video data to and from the user 200, if desired.

The projector 50 may project the display 140 out into space in front of the user, as occurs with a holographic projection system, or may consist of any of several head-mounted optical projection systems, such as the HOPROS™ unit produced by Optronic Instruments & Products, the PROVIEW™ system produced by KEO, or the Mark II GP Series of wearable displays available from Seattle Sight Systems, Inc. The projector 50 may also comprise a see-through liquid crystal display with the display 140 indicated directly thereon, or a retinal scanner, such as the Virtual Retinal Display being developed by the Human Interface Technology Laboratory at the University of Washington. In more sophisticated embodiments of this invention, the display 140 as perceived by the user 200 can be adjusted to accommodate vision correction or deficiency so that any image perceived by a particular user 200 will appear in sharp focus. The adjustment can be programmed into the processor 20 by sensing a user-controlled input (not shown), or mechanically adjusted by moving the display 140 closer to, or farther away from, the eye. The recognition display 42 and the stylus 45 input devices are similar to those readily available in the market, and can be identical to those used on electronic appointment calendars or pen-top computers. The recognition display 42 can be separated from the keyboard 40 and used alone, without the use of the keyboard 40. In addition, the recognition display 42 may contain the intelligence necessary for independent handwriting or printing recognition, or may pass on electrical signals so that the wearable processor 20 can recognize the content of the user message entry by way of writing recognition algorithms well known in the art. The present invention anticipates that the user 200 will receive feedback at the message area 100 in character text form for each message entered on the recognition display 42. In this way, the user 200 can be assured that what is written on recognition the display 42, using the stylus 45, is properly translated into text for transmission to others. In an alternative embodiment of the present invention, transmission of the characters will not occur until the user has authorized such transmission.

The communication system 10 anticipates use as a real-time language translator for disabled persons, as well as for those who can hear and speak. Language translation software modules are readily available for use with text received by the wearable processor after voice recognition occurs, or after messages have been input via the keypad-tablet 35. Several such language translation program modules may be simultaneously resident in the processor 20 memory. The user 200 can, for example, write or type a message in English, and after textual translation, it will be "spoken" in a selected alternate language via the speech synthesizer 67 and the speaker 60. Additionally, a foreign language speaker may verbally address the user 200, who, upon selecting the proper translation software module for execution by the processor 20, may then (after recognition and translation occurs) be enabled to read the translated message at the message area 100 of the display 140 (or hear the synthesized version thereof) in the user's 200 own language. Deaf/mute users may also communicate between themselves, each in their own different language, by a similar process.

The present invention will also facilitate round-table discussions among those conversing in two or more languages, by way of speech and/or remote transceiver broadcast and transmission. It is anticipated that appropriate translation codes, either oral or electromagnetic, will be sent with the text so that the communication system 10 can automatically engage the proper software translation module for use by the processor 20. Such operational methods will obviate the need for manual selection of translation software modules.

It is also anticipated that the user 200 will be able to enjoy television or theater using the communication system 10 by employing the microphone 70 and the speech recognizer 55 to produce text via the processor 20 for presentation to the user 200 via the display 140. By using communication system 10, it does not matter whether the speaker is directly facing the listener or has turned away from the front of the stage. In addition, even if the speaker has left the immediate area of the listener, the communication system 10 will enable the listener to receive the appropriate message in an environment in which audio communication is possible. At more remote locations, the user may employ the remote data transceiver 72 and the energy transceiver 77 to enable such communications. Such use of the system 10 will obviate the need for expensive subtitle apparatus for use with televisions, and dependence on the proper coding which much be supplied by the television network therefor.

The method of communication for deaf, hearing impaired, or mute persons presented herein comprises the steps of: receiving audio information; converting the audio information, whether speech or other information, such as a siren or explosion, intospeech data; then converting the speech data into a symbolic representation which is meaningful to the user (e.g. German language text characters for a German language speaker); and displaying the symbolic representation to the user, either in the space in front of the eye, or directly onto the eye, as occurs with retinal scanning. The method further comprises acquiring user messages which are intended for transmission to others in the surrounding environment and transmitting those messages to the surrounding environment in the form of audio information.

Although the invention has been described with reference to a specific embodiment, this description is not meant to be construed in a limiting sense. On the contrary, even though only specific devices have been shown to be mounted to the headband 120, all elements of the instant invention can be mounted thereon, given sufficient miniaturization. Also, various alternative stylized displays can be used, other than that shown in FIG. 2. As long as the user is given visual indication of the message he receives from the environment, the spirit of this invention is effected. Other various modifications of the enclosed embodiments will become apparent to those skilled in the art upon reference to the description of the invention. It is, therefore, contemplated that the following claims will cover such modifications, alternatives, and equivalents that fall within the true spirit of the scope of the invention.

We claim:

1. A communication system for deaf, hearing impaired, or mute persons, comprising:
    a message reception means for receiving audio information;
    an information conversion means to convert said audio information into speech data, said information conversion means being in communication with said message reception means;
    a data processing means for organizing said speech data into a symbolic representation of said speech data, said data processing means being in communication with said information conversion means;
    a visual display means for displaying said symbolic representation, said display means being in communication with said data processing means;
    a message entry means for acquisition of user messages, said message entry means being in communication with said data processing means; and
    a message transmission means for conversion of said user messages into message data and transmission of said message data into the surrounding environment, said message transmission means being in communication with said data processing means.

2. The system of claim 1 wherein said message reception means further comprises a microphone.

3. The system of claim 1 wherein said message reception means further comprises a microphone and a filter.

4. The system of claim 1 wherein said information conversion means comprises a speech recognizer.

5. The system of claim 1 wherein said information conversion means comprises a continuous speech recognizer.

6. The system of claim 1 wherein said data processing means comprises a personal computer.

7. The system of claim 1 wherein said data processing means comprises a personal digital assistant.

8. The system of claim 1 wherein said display means is affixed to a pair of eye glasses.

9. The system of claim 1 wherein said display means is affixed to a headband.

10. The system of claim 1 wherein said display means comprises a liquid crystal display.

11. The system of claim 1 wherein said display means comprises a see-through liquid crystal display.

12. The system of claim 1 wherein said display means comprises a retinal scanner.

13. The system of claim 1 wherein said display means comprises a holographic projection system.

14. The system of claim 1 further comprising a storage device, said storage device being in communication with said data processing means.

15. The system of claim 1 further comprising a cellular telephone, said cellular telephone being in communication with said information conversion means and said message transmission means.

16. The system of claim 1 further comprising a remote data transceiver, said transceiver being in communication with said information conversion means and said message transmission means.

17. A method of communication for deaf, hearing impaired, or mute persons, comprising the steps of:

receiving audio information;

first converting said audio information into speech data;

second converting said speech data into a symbolic representation of said data;

displaying said symbolic representation in a visual format;

acquiring user messages; and transmitting said messages to the surrounding environment in the form of audio information.

18. The method of claim 17 wherein said receiving step is accomplished with a microphone.

19. The method of claim 17 wherein said receiving step is accomplished with a microphone and a filter.

20. The method of claim 17 wherein said first converting step is accomplished with a speech recognizer.

21. The method of claim 17 wherein said second converting step is accomplished with a personal computer.

22. The method of claim 17 wherein said displaying step is accomplished with a liquid crystal display.

23. The method of claim 17 wherein said displaying step is accomplished with a see-through liquid crystal display.

24. The method of claim 17 wherein said displaying step is accomplished with a retinal scanner.

25. The method of claim 17 wherein said displaying step is accomplished with a holographic projector.

26. A communication system for deaf, hearing impaired, or mute persons, comprising:

a message reception means for receiving audio information;

a data processing means to convert said audio information into speech data and organize said speech data into a symbolic representation of said speech data, said data processing means being in communication with said message reception means;

a display means for displaying said symbolic representation, said display means being in communication with said data processing means;

a message entry means for acquisition of user messages, said message entry means being in communication with said data processing means; and a message transmission means for conversion of said user messages into message data and transmission of said message data into the surrounding environment, said message transmission means being in communication with said data processing means.

27. The system of claim 26 further comprising a remote data transceiver, said transceiver being in communication with said data processing means and said message transmission means.

\* \* \* \* \*